April 4, 1961 W. RITZERFELD ET AL 2,977,874
OPERATION CONTROL ARRANGEMENT FOR DUPLICATORS
Filed Oct. 21, 1958 5 Sheets-Sheet 4

Inventors
Wilhelm Ritzerfeld
Gerhard Ritzerfeld
by Michael S. Striker
Attorney

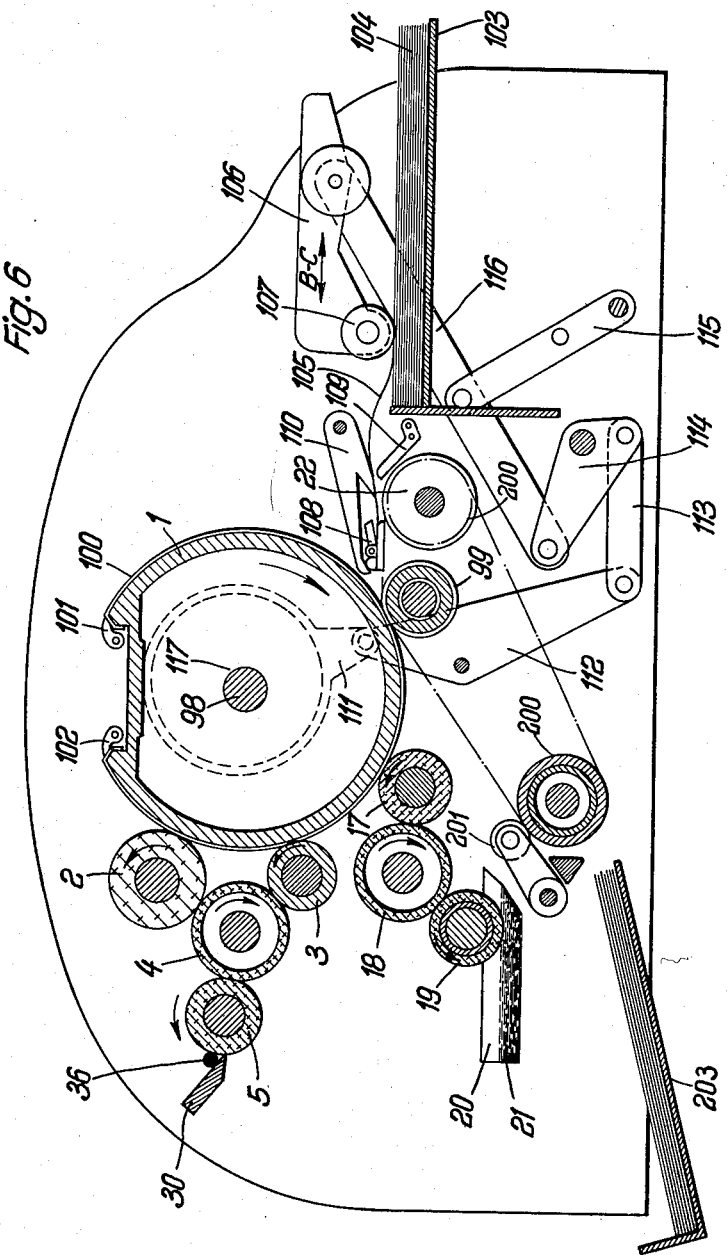

United States Patent Office 2,977,874
Patented Apr. 4, 1961

2,977,874

OPERATION CONTROL ARRANGEMENT FOR DUPLICATORS

Wilhelm Ritzerfeld, Schorlemer Allee 14, Berlin-Dahlem, and Gerhard Ritzerfeld, Franzensbader Str. 21, Berlin-Grunewald, Germany Filed Oct. 21, 1958, Ser. No. 768,583

Claims priority, application Germany Oct. 25, 1957

14 Claims. (Cl. 101—145)

The present invention relates to an operation control arrangement for rotary duplicators, and more particularly to a control arrangement including a manually operated control member which effects in a predetermined order operation of moistening means, inking means, feeding means for copy sheets and counter pressure means as required for lithographic printing.

It is one object of the present invention to provide a control arrangement by which the operator initiates and stops all operations of the duplicator in a predetermined order in a foolproof manner.

Another object of the present invention is to provide a control arrangement for a rotary duplicator in which a manually operated control member is stopped in each control position of the control member, and can be moved to the next following operation only by another manual operation, so that it is assured that the printing drum performs at least one revolution in each control position of the control member.

Another object of the present invention is to provide a control arrangement in which the control member is stopped in certain positions only during the start of the machine, but is not stopped when the control member is moved in a return direction for terminating the operations of the machine.

Another object of the present invention is to provide a control arrangement which automatically prevents the inking and moistening of the printing form when no copy sheets are supplied to the printing drum.

Another object of the present invention is to provide a control arrangement which automatically prevents the transfer of liquid from the moistening means to the ink supplying means during idling of the duplicator.

With these objects in view, the present invention mainly consists in a control arrangement for rotary duplicator and comprises printing drum means for supporting a printing form; counter pressure roller means cooperating with the printing drum; roller means for moistening the printing form, and other roller means for inking the printing form, a manually operated control member connected to each of said roller means and being movable between a plurality of positions for moving said roller means in a predetermined order to and from operative positions cooperating with the printing drum; and stop means for stopping the control member in each of the control positions thereof.

The stop means preferably include a guide member having a guide slot for guiding the control member and including a plurality of stops projecting into the guide slot and defining the control positions of the control member. Furthermore, a movable stop member is provided which can be moved to an operative position projecting into the guide slot for stopping the control member. When the stop member is moved to its inoperative position the control member can pass the respective control position, as is required during the return movement of the control member which is preferably effected by a spring acting on the control member.

In the preferred embodiment of the present invention, the control member includes a handle lever part, and a second part connected to the handle by coupling means which are rendered ineffective in certain positions of the control member. In this manner, certain operations of the machine can be initiated and stopped by the second part, and other operations can be initiated and stopped by the handle part after the same has been separated from the second part.

In order to permit passing of stops after the respective operation has been initiated, the control member is transversely displaceable so that it may be moved past the stop by manual operation, or under the guidance of an inclined guide face on a stop.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings, in which:

Fig. 6 is a fragmentary sectional view illustrating the arrangement of the moistening means, inking means, and sheet feeding means used in the embodiment of Fig. 1.

Figure 1:
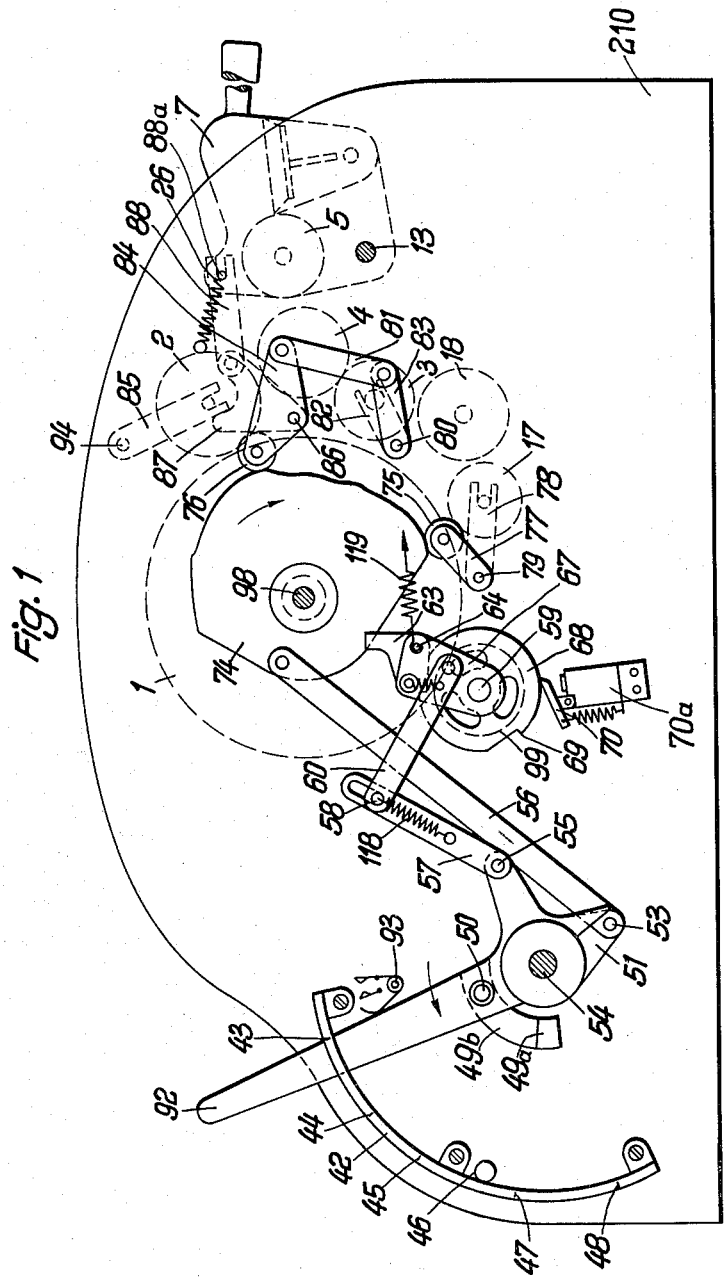
Fig. 1 is a fragmentary side view of a control arrangement according to the present invention, with known parts of a duplicator omitted for the sake of clarity.

Referring now to the drawings, and more particularly to Figs. 1 and 6, a printing drum is mounted on a shaft 98, and has clamping means 101 and 102 for holding a printing form 100 on the periphery thereof. A counter pressure roller 99 cooperates with the printing drum 1 along a printing line to print copy sheets 105 supplied by feeding means from a stack of sheets 104 located on a support 103. The feeding means include a reciprocating member 106 which carries a pair of rollers 107 engaging the top sheet 105 during the feeding stroke of member 106 to feed sheet 105 to the guide means 110 and 109 and to the holding means 108 which hold the sheet in proper position. Transporting roller means 200 and 201 are provided for guiding the printed sheets to a receiving table 203. The reciprocating member 106 moves in direction of arrows B—C and is operated by a linkage 116, 114, 113, and 112 from a member 111 which is oscillated by a rotary eccentric member 117 which turns with the duplicating roller. A lever 115 supports link 116 for reciprocating movement. This arrangement is not an object of the present invention.

Two inking rollers 2 and 3 are provided which in the operative position shown in Fig. 6 transfer ink to the printing form 100. Inking rollers 2 and 3 cooperate with a transfer roller 4, which receives ink from an ink supply roller 5 to which a uniform amount of ink is supplied by members 36 and 30 in a conventional manner.

The moistening roller 17 is supplied with a liquid through the transfer roller 18 and the liquid supply roller 19 which runs in a vessel 20 containing a liquid 21. This arrangement is known and not an object of the present invention.

Figure 2:
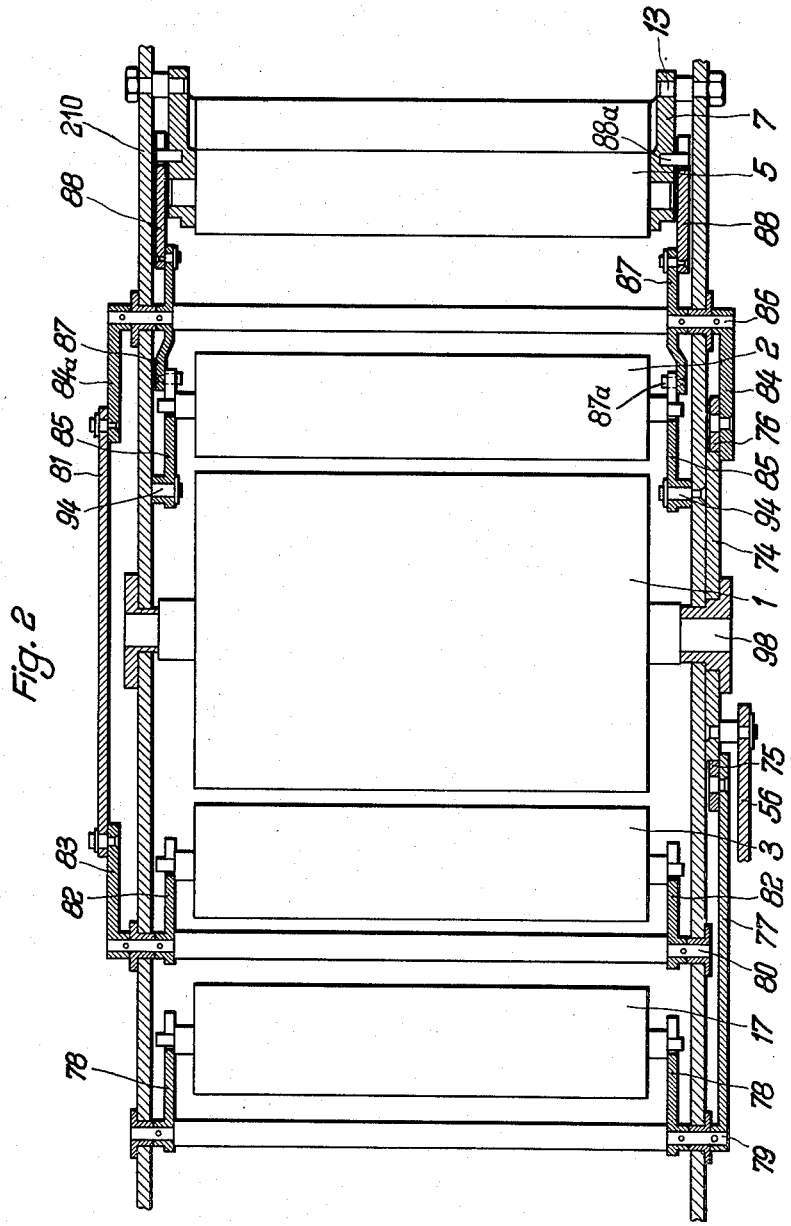
Fig. 2 is a developed plan view of the arrangement, with some of the parts shown in section.

Referring now to Figs. 1 and 2, it will be seen that the moistening roller 17 is mounted on a pair of forked levers 78 which are fixed on a shaft 79. Another lever 77 is also fixed to shaft 79 and carries a cam follower roller 75 rolling on the peripheral cam track of a cam means 74 which is mounted on shaft 98 for turning movement.

The inking roller 2 is mounted on a pair of forked levers 85 which are mounted for turning movement by pivot pins 94 on the side walls of the machine 210.

The other inking roller 3 is mounted on a pair of forked levers 82 which are connected by a shaft 80. Another lever 83 is also secured to shaft 80, and is articulated to a link 81 which is pivotally connected to a lever 84a which is fixed on a shaft 86. Shaft 86 carries on its other end a triangular lever 84 on which a cam follower roller 76 is mounted. Cam follower roller 76 engages a cam track of cam 74. A pair of levers 87 are also fixed on shaft 86 and have pins 87a cooperating with levers 85 in which inking roller 2 is mounted. It is apparent that in different positions of cam 74, levers 84 will be displaced and move the inking rollers 2 and 3 to different positions.

Figure 3:
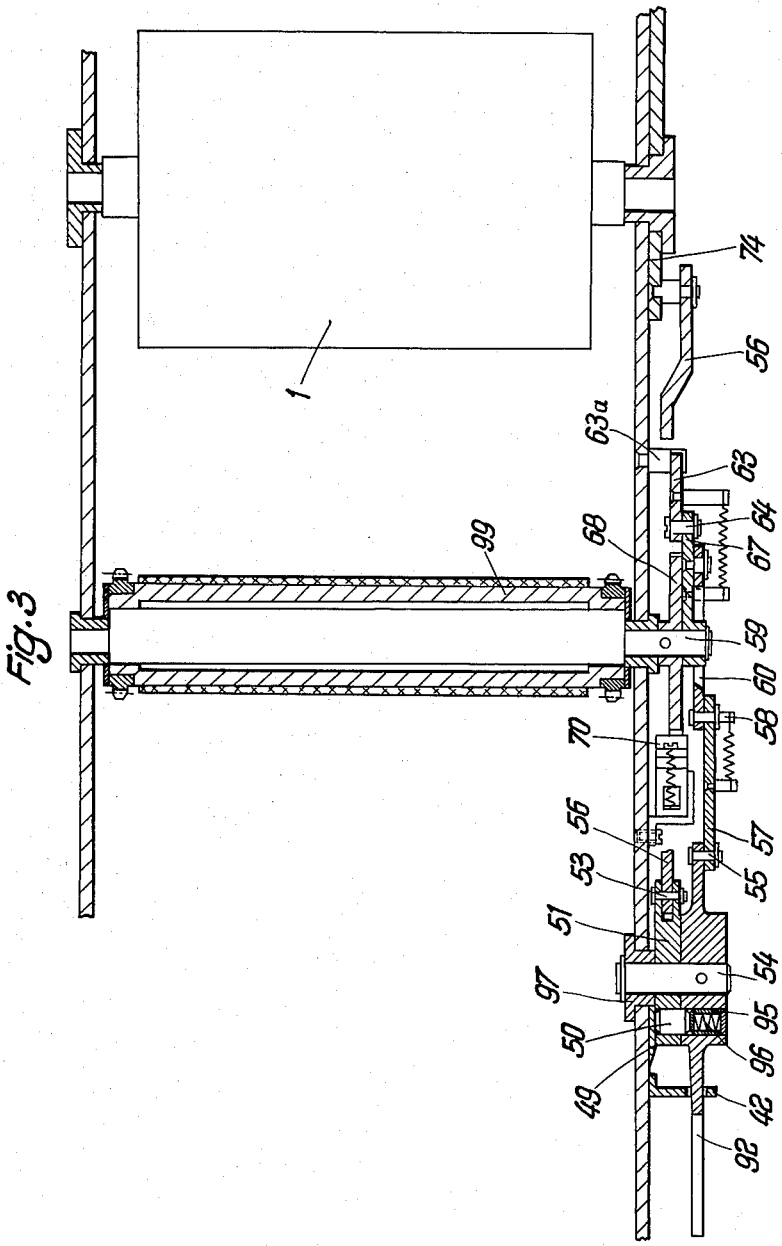
Fig. 3 is a fragmentary developed sectional plan view illustrating parts of the embodiment shown in Figs. 1 and 2.

Levers 87 are articulated to a pair of levers 88 whose forked ends engage a pair of pins 88a provided on an inking box 7 which is pivotally mounted in the frame of the machine on supporting pins 13. The previously mentioned ink supply roller 5 is mounted on the side walls of box 7, and is shown in Fig. 1 in a position spaced from the transfer roller 4. In order to obtain a successive movement of rollers 2, 3, 17, and 5 to and from operative positions, it is necessary to turn cam 74 through different angles which is obtained by operation of the handle lever 92. Lever 92 is the first part of a control member which includes a second part 51. As best seen in Fig. 3, parts 92 and 51 are mounted for turning movement in the side walls of the machine by means of a pivot pin 94. A coupling pin 50 is urged by a spring 96 to engage a cam member 49 which has a receding face portion 49a. As long as coupling pin 50 slides on the cam portion 49b during turning movement of handle 92, coupling pin 50 couples part 51 to part 92. When coupling pin 50 slides on the inclined cam portion 49a, the coupling pin 50 moves out of the bore in handle lever 92, and further turning movement of handle lever 92 will not turn part 51.

Part 51 is pivotally connected by a pin 53 to a link 56 which is articulated to cam 74. Consequently as long as part 54 is coupled to handle 92, cam 74 will be turned through an angle related to the turning angle of handle 92. When coupling pin 50 engages cam portion 49a, cam 74 will not be turned during further movement of handle 92.

The handle part 92 has a projecting arm which is articulated by pin 55 to a link 57 provided with a slot. A spring 118 is secured to link 57, and acts on a pin 58 secured to a lever 60. Lever 60 is articulated to another lever 67 on which a pawl 63 is mounted by means of a pin 64. Pawl 63 cooperates with a pin 63a on a wall of the machine, as best seen in Fig. 3. A member 68 is fixedly secured to the shaft 59 of the counter pressure roller 99 and has catch recesses 69 cooperating with a catch 70 which is controlled by electromagnetic means 70a. Turning of the eccentric shaft 59 by members 60, 67 and 68 will effect movement of the counter pressure roller 99 to an operative position cooperating with the printing form on the printing drum 1.

Figure 4:
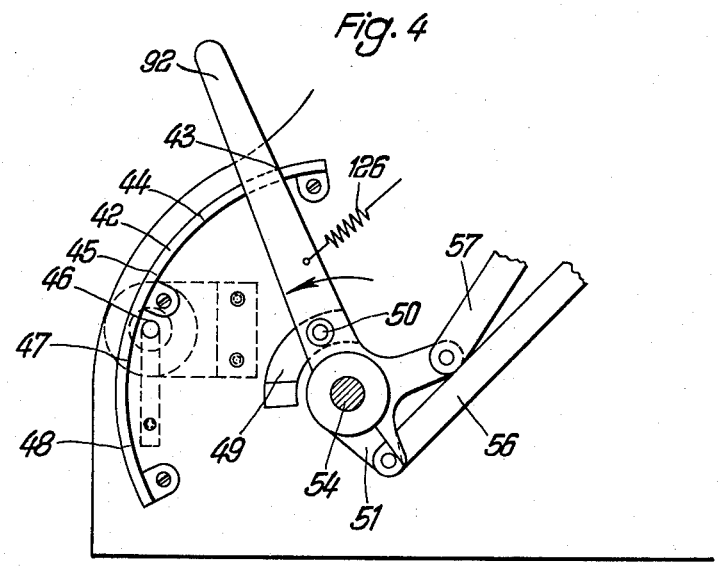
Fig. 4 is a fragmentary side view of a detail of Fig. 1.
Figure 5:
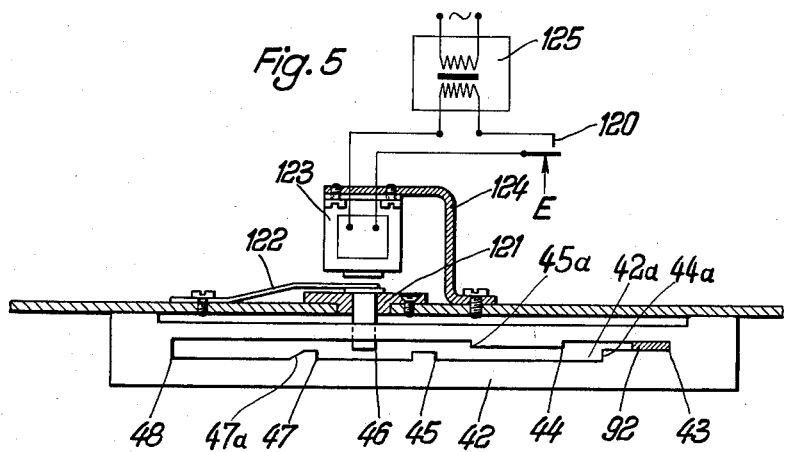
Fig. 5 is a developed plan view, partly in section, of the device shown in Fig. 4.

As shown in Figs. 1, 4 and 5, lever 92 is guided for movement in a slot 42a of a stationary guide member 42. Guide member 42 has a plurality of transverse projections which define a plurality of control positions of lever 92. In its initial position, lever 92 abuts against stop 43. Lever 92 can be manually moved to a second position abutting against stop 42. When the transversely resilient lever 92 is moved in transverse direction, it is released by stop 44, and free to be moved by manual operation to its next position engaging stop 45. When lever 92 is again transversely moved, it passes stop 45 and engages a stop member 46 which will be described hereinafter in greater detail. By transverse movement, stop member 46 is passed, and lever 92 can move to the next control position engaging stop 47. By transverse movement, stop 47 is passed, and lever 92 can move to its final position engaging stop 48. Lever 92 moves under manual control in the forward direction from stop 43 to stop 48, but a spring 126, see Fig. 4, urges lever 92 to move in return direction so that upon release of lever 92 it will perform a return stroke. During such return stroke, lever 92 will pass stop 47 since it is displaced by an inclined guide face 47a on the same.

Stop member 46 is slidably mounted in a bore of a member 121 which is secured to the supporting frame of the machine. A spring 122 urges stop 46 to its operative position projecting in the region of the guide slot 42a and into the path of movement of lever 92. An electromagnetic means 123 is provided for retracting stop member 46 to its inoperative position in which it is not located in the path of movement of lever 92. Electromagnetic means 123 is connected into a circuit including a switch 120 and a transformer 125. Switch 120 is operated by the counter pressure roller means when the same is moved to its inoperative position. Consequently, when counter pressure roller means is inoperative, switch 120 is closed, and electromagnetic means 123 retracts stop member 46 to its inoperative position.

It is evident that if stop member 46 is retracted, lever 92 under action of spring 126 will move during its return movement until it engages the stop 45a so that lever 92 is stopped in a position corresponding to the position engaging stop 45 during the forward stroke of lever 92.

When lever 92 is transversely moved to pass stop 45a, it will move on until it engages stop 44a in a position corresponding to the position engaging stop 44 during the forward movement of lever 92. When lever 92 is further returned into engagement with the stop face 43, it opens a switch 93, see Fig. 1 which is connected into the circuit of the motor which drives the duplicating machine.

The apparatus operates as follows:

In the initial position of control member 92, 51 lever 92 engages stop face 43, and the motor of the machine is disconnected by switch 93. All rollers are separated from each other as illustrated in Fig. 1.

The control member 92, 51 is now moved until it engages stop 44. Switch 93 closes, and the motor of the machine starts. The control member is now transversely moved to release stop 44, and then forwardly moved until it engages stop 45. The movement of the control member has displaced link 56, since part 51 is coupled to lever 92. Link 56 turns cam 74 through a predetermined angle in direction of the arrow shown in Fig. 1 so that the cam follower rollers 75 and 76 are operated. Lever 77 turns lever 78 through shaft 79, and the moistening roller 17 is shifted to a position engaging the transfer roller 18 so that liquid is transferred from container 20 through rollers 19 and 18 to moistening roller 17. At the same time, lever 84 turns lever 87 through shaft 86 and displaces levers 85 so that inking roller 2 is displaced to engage the transfer roller 4. Lever 87 shifts lever means 88 to move box 7 with ink supply roller 5 into a position in which ink supply roller 5 rolls on the transfer roller 4. Lever 84 simultaneously shifts link 81 and levers 83 so that levers 82 are displaced through shaft 80, and inking roller 3 is moved to a position rolling on transfer roller 4.

In this position, the moistening roller 17 is moistened, and the inking rollers 2 and 3 are provided with ink.

Lever 92 is transversely displaced to be released from stop 45 and moved on until it reaches stop member 46 which is in its operative position. Cam 47 is further turned, and effects through elements 75, 77, 79, and 78 shifting of moistening roller 17 to an operative position engaging the printing form on the printing drum 1 and moistening the same. Moistening roller 17 remains in rolling engagement with roller 18.

Lever 92 is further moved until it engages stop 47. Cam 74 is further turned, and the respective cam track portion shifts lever 84 to such a position that the inking rollers 2 and 3 are moved to an operative position engaging the printing form on the printing drum 1. Inking rollers 2 and 3 remain in rolling engagement with transfer roller 4.

Lever 92 is now shifted to the end of guide slot 42a, and engages stop face 48. During movement of lever 92 to this position, coupling pin 50 slides onto the cam portion 49a, and assumes a position releasing part 51 so that the inking rollers 2 and 3 and the moistening rollers remain in operative position rolling on the printing form. As lever 92 moves on to its terminal position engaging stop 48, it shifts the linkage 57, 60, 67 and turns member 68 so that the eccentric shaft 59 moves the counter pressure roller 99 to its operative position cooperating with the printing drum. The recess 69 on member 68 is engaged by the locking catch 70 so that the counter pressure roller is locked. When it is desired to move the counter pressure roller to an inoperative position, electromagnetic means 70a is operated to retract the catch 70.

During movement of lever 92 to its terminal position abutting on stop 48, eccentric member has been turned through a suitable linkage, not shown, so that the feeding means 106, 107 become operative to feed sheets to the printing line between the printing form 100 and the counter pressure roller 99, as shown in Fig. 6. Consequently, the copy sheets are printed by the printing form moistened and inked as described above.

Lever 92 can be released as soon as the counter pressure roller is locked in operative position, and is returned by a spring 126. During the return movement, the coupling pin 50 again couples lever 92 to part 51. Lever 92 passes stop 47 due to the inclined face 47a, and is stopped during the return stroke by stop member 46 in a position corresponding to the position assumed by lever 92 engaging stop 47 during the forward stroke if counter pressure roller 99 is still operative, so that the inking and moistening rollers remain operative. Control member 92, 51 can again be forwardly moved from this position if desired, but control member 92, 51 moves on in rearward direction when the counter pressure roller is moved to its inoperative position whereby switch 120 is closed, and stop member 46 retracted to its inoperative position. This permits further return movement of the control member until lever 92 engages stop 45a and is stopped in a position corresponding to the position engaging stop 45 during the forward stroke. This results in movement of the moistening roller 17 to its inoperative position. The control member is then moved past stop 44a to its initial position in which all rollers are inoperative and the motor is disconnected.

When stop member 46 is retracted, the control member cannot stop in a position in which the moistening and inking rollers are operative to supply liquid and ink to the printing form while the feeding means for the mechanism are already stopped during the first part of the return stroke of the control member. Since the control member is spring-operated to move directly to a position for shifting the moistening roller and inking rollers to an inoperative position, the operator cannot, by mistake, leave the lever in a position in which the inking rollers and moistening rollers roll on the printing form which would result in the transfer of an undesired amount of moistening liquid into the ink supply means. This is of particular importance for fully automatic inking arrangements in which all inking rollers are in rolling engagement with the printing form on the printing drum. If moistening liquid is transferred from the printing form and the inking roller to the ink supply roller 5, it enters the ink supply box 7, and dilutes the ink which may result in stopping of the inking rollers.

It will be understood that each of the elements described above, or two or more together, may also find a useful application in other types of rotary duplicators differing from the types described above.

While the invention has been illustrated and described as embodied in an operation control means for rotary duplicators for initiating and terminating the operations of the machine in a predetermined order, it is not intended to be limited to the details shown, since various modifications and structural changes may be made without departing in any way from the spirit of the present invention.

Without further analysis, the foregoing will so fully reveal the gist of the present inveniton that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rotary duplicator, a control arrangement, comprising, in combination, printing drum means for supporting printing form means; counter pressure roller means cooperating with said printing drum means; roller means for moistening said printing form means; roller means for inking said printing form means, each of said roller means being movable to and from an operative position cooperating with said printing drum means; a manually operated control member connected to each of said roller means and being movable in a forward stroke and in a return stroke between a plurality of positions for moving said roller means in a predetermined order to and from said operative positions thereof; a stationary guide member having a guide slot for guiding said control member for movement between said positions and including a plurality of stops projecting into said guide slot and defining said positions of said control member, said control member being transversely displaceable in said slot for passing said stops; at least one stop member movable between an operative position for projecting into said guide slot for stopping said control member, and an inoperative position; and electromagnetic operating means for moving said stop member during the forward stroke of the control member to said operative position and during the return stroke to said inoperative position, said operating means being operatively connected to said counter pressure roller means and controlled by the same so that said counter pressure roller means and said stop member move simultaneously to said operative and inoperative positions thereof, said electromagnetic operating means including circuit means and a switch in said circuit means, said switch being adapted to be operated by said counter pressure roller means during movement of the same to and from said operative position thereof.

2. In a rotary diuplicator, a control arrangement, comprising, in combination, printing drum means for supporting printing form means; counter pressure roller means cooperating with said printing drum means; roller means for moistening said printing form means; roller means for inking said printing form means, each of said roller means being movable to and from an operative position cooperating with said printing drum means; a manually operated control member including a first manually operated part, a second part connected to each of said moistening and inking roller means, and a releasable coupling means connecting said first and second parts, said control member being movable in a forward stroke and in a return stroke in coupled position of said coupling means between a plurality of positions for moving said moistening and inking roller means in a predetermined order to and from said operative positions thereof, and said first part being connected to said counter pressure roller means for moving the same to and from said operative position; releasing means for releasing said coupling means in a selected position of said control member so that said second part stops with said moistening and inking roller means in operative positions, said first part being movable in forward direction to a further position for moving said counter pressure roller means to said operative position; means urging said first part to perform said return stroke; a stationary guide member having a guide slot for guiding said first part of said control member for movement between said positions and including a plurality of stops projecting into said guide slot and defining said positions of said control member; at least one stop member movable between an operative position projecting into said guide slot for stopping said control member, and an inoperative position; and operating means for moving said stop member to said operative position thereof during said forward stroke and to said inoperative position during said return stroke and being adapted to be operated by said counter pressure roller means during movement of the same to and from said operative position thereof.

3. An apparatus as set forth in claim 2 wherein said coupling means include a spring-loaded coupling pin and bores in said first and second parts of said control member for receiving said pin, and wherein said releasing means include a stationary cam means engaged by said coupling pin and permitting movement of said spring-loaded coupling pin to a releasing position releasing said first part in a predetermined position of said second part.

4. An apparatus as set forth in claim 2 and including means for locking said counter pressure roller means in said operative position thereof.

5. In a rotary duplicator, a control arrangement, comprising, in combination, printing drum means for supporting printing form means; counter pressure roller means cooperating with said printing drum means; roller means for moistening said printing form means; roller means for inking said printing form means, each of said roller means being movable to and from an operative position cooperating with said printing drum means; a manually operated control member including a first manually operated part, a second part, and a releasable coupling means connecting said first and second parts, said control member being movable in coupled position of said coupling means between a plurality of positions, and said first part being connected to said counter pressure roller means for moving the same to and from said operative position; a turnable cam means; linkage means connecting said cam means with said second part of said control member so that said cam means turns when said control member is moved between said positions thereof; cam follower means cooperating with said cam means and being connected to said moistening and inking roller means, respectively, for moving the same in a predetermined order to and from said operative positions thereof while said control member moves between said positions thereof; releasing means for releasing said coupling means in a selected position of said control member so that said second part stops with said moistening and inking roller means in operative positions, said first part being movable to a further position for moving said counter pressure roller means to said operative position; and a stationary guide member having a guide slot for guiding said first part of said control member for movement between said positions and including a plurality of stops projecting into said guide slot and defining said positions of said control member.

6. In a rotary duplicator, a control arrangement, comprising, in combination, printing drum means for supporting printing form means; counter pressure roller means cooperating with said printing drum means; roller means for moistening said printing form means; roller means for inking said printing form means, each of said roller means being movable to and from an operative position cooperating with said printing drum means; a manually operated control member including a first manually operated part, a second part connected to each of said moistening and inking roller means, and a releasable coupling means connecting said first and second parts, said control member being movable in a forward stroke and in a return stroke in couple position of said coupling means between a plurality of positions for moving said moistening and inking roller means in a predetermined order to and from said operative positions thereof, and said first part being connected to said counter pressure roller means for moving the same to and from said operative position; a turnable cam means; linkage means connecting said cam means with said second part of said control member so that said cam means turns when said control member is moved between said positions thereof; cam follower means cooperating with said cam means and being connected to said moistening and inking roller means, respectively, for moving the same in a predetermined order to and from said operative positions thereof while said control member moves between said positions thereof; releasing means for releasing said coupling means in a selected position of said control member so that said second part stops with said moistening and inking roller means in operative positions, said first part being movable in forward direction to a further position for moving said counter pressure roller means to said operative position; means urging said first part to perform said return stroke; a stationary guide member having a guide slot for guiding said first part of said control member for movement between said positions and including a plurality of stops projecting into said guide slot and defining said positions of said control member; at least one stop member movable between an operative position projecting into said guide slot for stopping said control member, and an inoperative position; and operating means for moving said stop member to said operative position thereof during said forward stroke and to said inoperative position during said return stroke and being adapted to be operated by said counter pressure roller means during movement of the same to and from said operative position thereof.

7. In a rotary duplicator, a control arrangement, comprising, in combination, printing drum means for supporting a printing form means; counter pressure roller means movable between an inoperative position, and an operative position cooperating with said printing drum means; first roller means for moistening said printing form means and being movable between an inoperative position, and an operative position for moistening said printing form means; second roller means for supplying ink; third transfer roller means associated with said second roller means; fourth roller means for inking said printing form and cooperating with said third roller means; fifth means movable to and from an operative position for feeding sheets to said printing drum means; means supporting each of said second, third and fourth roller means for movement between a first operative position in which the same roll on each other for transferring ink to said fourth roller means, and a second operative position in which said fourth roller means cooperates with said printing drum means for inking said printing form; a manually operated control member connected to each of said roller means and to said fifth means and being movable in a forward stroke and in a return stroke between a plurality of positions for moving said roller means and said fifth means in a predetermined order to and from said operative positions thereof; means urging said control member to perform said return stroke; a stationary guide member having a guide slot for guiding said control member for movement between said positions and including a plurality of transversely projecting stops projecting into said guide slot and defining said positions of said control member, said control member being transversely displaceable for moving the same past said stop means, and the one stop associated with the position of said control member in which said fourth roller means assumes said second operative position having an inclined guide face engaged by said control member during the return stroke so that said control member passes said one stop during the return stroke; at least one stop member movable between an operative position projecting into said guide slot for stopping said control member and an inoperative position, said stop member following said one stop in direction of the return stroke and being associated with said second operative position of said first roller means; and operating means for moving said stop member during the forward stroke of said control member to said operative position, and during the return stroke to said inoperative position thereof.

8. In a rotary duplicator, a control arrangement, comprising, in combination, printing drum means for supporting a printing form means; counter pressure roller means movable between an inoperative position, and an operative position cooperating with said printing drum means; first roller means for moistening said printing form means and being movable between an inoperative position, and an operative position for moistening said printing form means; second roller means for supplying ink; third transfer roller means associated with said second roller means; fourth roller means for inking said printing form and cooperating with said third roller means; fifth means movable to and from an operative position for feeding sheets to said printing drum means; means supporting each of said second, third and fourth roller means for movement between a first operative position in which the same roll on each other for transferring ink to said fourth roller means, and a second operative position in which said fourth roller means cooperates with said printing drum means for inking said printing form; a manually operated control member including a first manually operated part, a second part connected to said first, second, third and fourth roller means, and a releasable coupling means connecting said first and second parts, said control member being movable in a forward stroke and a return stroke for moving in coupled position of said coupling means said first, second, third and fourth roller means in a predetermined order to and from said operative positions thereof, and said first part being connected to said counter pressure roller and to said fifth means for moving the same to and from said operative positions; releasing means for releasing said coupling means during the forward stroke in a selected position of said control member so that said second part stops with said first and fourth roller means in operative positions adapted to cooperate with said printing form, and with said second and third roller means supplying ink to said fourth roller means, said first part of said control member being movable in forward direction to a further position for moving said counter pressure roller means and said fifth means to said operative position, said first part being transversely displaceable; a stationary guide member having a guide slot for guiding said first part of said control member for movement between said positions and including a plurality of transversely projecting stops projecting into said guide slot and defining said positions of said control member, one of said stops having an inclined guide face engaged by said first part of said control member during the return stroke so that said control member is transversely displaced and passes said one stop during the return stroke; a stop member movable between an operative position projecting into said guide slot for stopping said control member, and an inoperative position; operating means for moving said stop member to said operative position during said forward stroke and to said inoperative position during the return stroke; and means urging said control member to move in direction of the return stroke so that the same passes during the return stroke said one stop and said stop member and is stopped by another stop of said guide member, said control member being adapted to be transversely moved by manual operation past said stops and past said stop member in operative position.

9. An apparatus as set forth in claim 8, wherein said operating means includes electromagnetic means for operating said stop member, a circuit means, and a switch in said circuit means, said switch being adapted to be controlled by one of said roller means during movement of the same to said inoperative position for moving said stop member to said inoperative position.

10. In a rotary duplicator, a control arrangement, comprising, in combination, a printing drum for supporting a printing form; pressure roller means movable to and from an operative position cooperating with said printing drum; feeding means for feeding copy sheets to said printing drum and pressure roller means; roller means for moistening and inking said printing form movable to and from operative position cooperating with said printing drum; a manually operated control member connected to each of said roller means and to said feeding means and being movable in a forward stroke for rendering said means successively operative, and in a return stroke for rendering said means in a reversed order successively inoperative, said positions including a control position in which only said moistening and inking roller means are operative, and an end position in which said pressure roller means and feeding means are also operative, said control member being displaceable transverse to the direction of movement thereof; a stationary guide member including a guide slot for guiding said control member for movement between said positions and including a pair of stops transversely projecting into said guide slot and defining between each other said control position of said control member, one of said stops being forwardly located and having an inclined front face and a rearwardly located stop face for stopping said control member during the forward stroke, and the other stop having a forwardly facing stop face effective during the rearward stroke, said control member passing said stops when transversely displaced; and means urging said control member to perform the return stroke so that said control member is transversely displaced by said inclined front face of said one stop and is stopped in said control position by said front face of said other stop during the return stroke so that said control member can again be manually forwardly moved to said end position.

11. In a rotary duplicator, a control arrangement, comprising, in combination, a printing drum for supporting a printing form; pressure roller means movable to and from an operative position cooperating with said printing drum; arresting means movable to and from an arresting position for arresting said pressure roller means in said operative position; feeding means for feeding copy sheets to said printing drum and pressure roller means; roller means for moistening and inking said printing form movable to and from operative position cooperating with said printing drum; a manually operated control member connected to each of said roller means and to said feeding means and being movable in a forward stroke for rendering said means successively operative, and in a return stroke for rendering said means in a reversed order successively inoperative, said positions including a control position in which only said moistening and inking roller means are operative, and an end position in which said pressure roller means and feeding means are also operative, said control member being displaceable transverse to the direction of movement thereof; a stationary guide member including a guide slot for guiding said control member for movement between said positions and including a pair of stops transversely projecting into said guide slot and defining between each other said control position of said control member, one of said stops being forwardly located and having an inclined front face and a rearwardly located stop face for stopping said control member during the forward stroke, said other stop being movable between an inoperative position retracted from said slot and an operative position projecting into said slot and having a forwardly facing stop effective during the rearward stroke, said control member passing said stops when transversely displaced during the forward stroke; operating means for moving said other stop between said positions and for moving said arresting means to and from said arresting position and including electromagnetic means operatively connected to said arresting means and switch means operated by said pressure roller means when the same moves out of said operative position so that said arresting means is released when said counter pressure roller means moves out of said operative position, while said other stop means moves to said inoperative position; and means urging said control member to perform the return stroke during which said control member is transversely displaced by said inclined front face and is stopped in said control position by said front face of said other stop in said operative position, permitting forward movement of said control member to said end position, said control member passing said other stop when the same is in said inoperative position while said pressure roller means is in its inoperative position.

12. In a rotary duplicator, a control arrangement, comprising, in combination, a printing drum for supporting a printing form; pressure roller means movable to and from an operative position cooperating with said printing drum; roller means for moistening and inking said printing form movable to and from an operative position cooperating with said printing drum; a manually operated control member connected to each of said roller means and being movable in a forward stroke for rendering said means successively operative, and in a return stroke for rendering said means in a reversed order successively inoperative, said positions including a control position in which only said moistening and inking roller means are operative, and an end position in which said pressure roller means are also operative, said control member being displaceable transverse to the direction of movement thereof; a stationary guide member including a guide slot for guiding said control member for movement between said positions and including a pair of stops transversely projecting into said guide slot and defining between each other said control position of said control member, one of said stops being forwardly located and having an inclined front face and a rearwardly located stop face for stopping said control member during the forward stroke, and the other stop having a forwardly facing stop face effective during the rearward stroke, said control member passing said stops when transversely displaced; means urging said control member to perform the return stroke so that said control member is transversely displaced by said inclined front face of said one stop and is stopped in said control position by said front face of said other stop during the return stroke so that said control member can again be manually forwardly moved to said end position.

13. In a rotary duplicator, a control arrangement, comprising, in combination, a printing drum for supporting a printing form; pressure roller means movable to and from an operative position cooperating with said printing drum; arresting means movable to and from an arresting position for arresting said pressure roller means in said operative position; roller means for moistening and inking said printing form movable to and from operative position cooperating with said printing drum; a manually operated control member connected to each of said roller means and being movable in a forward stroke for rendering said means successively operative, and in a return stroke for rendering said means in a reversed order successively inoperative, said positions including a control position in which only said moistening and inking roller means are operative, and an end position in which said pressure roller means are also operative, said control member being displaceable transverse to the direction of movement thereof; a stationary guide member including a guide slot for guiding said control member for movement between each other said control position of said control member, one of said stops being forwardly located and having an inclined front face and a rearwardly located stop face for stopping said control member during the forward stroke, said other stop being movable between an inoperative position retracted from said slot and an operative position projecting into said slot and having a forwardly facing stop face effective during the rearward stroke, said control member passing said stops when transversely displaced during the forward stroke; operating means for moving said other stop between said positions and for moving said arresting means to and from said arresting position and including electromagnetic means operatively connected to said arresting means and switch means operated by said pressure roller means when the same moves out of said operative position so that said arresting means is released when said counter pressure roller means moves out of said operative position, while said other stop means moves to said inoperative position; and means urging said control member to perform the return stroke during which said control member is transversely displaced by said inclined front face and is stopped in said control position by said front face of said other stop in said operative position permitting forward movement of said control member to said end position, said control member passing said other stop when the same is in said inoperative position while said pressure roller means is in its inoperative position.

14. In a rotary duplicator, a control arrangement, comprising, in combination, a printing drum for supporting a printing form; pressure roller means movable to and from an operative position cooperating with said printing drum; arresting means movable to and from an arresting position for arresting said pressure roller means in said operative position; roller means for moistening and inking said printing form movable to and from operative position cooperating with said printing drum; a manually operated control member connected to each of said roller means and being movable in a forward stroke for rendering said means successively operative, and in a return stroke for rendering said means in a reversed order successively inoperative, said positions including a control position in which only said moistening and inking roller means are operative, and an end position in which said pressure roller means are also operative, said control member being displaceable transverse to the direction of movement thereof; a stationary guide member including a guide slot for guiding said control member for movement between said positions and including a pair of stops transversely projecting into said guide slot and defining between each other said control position of said control member, one of said stops being forwardly located and having an inclined front face and a rearwardly located stop face for stopping said control member during the forward stroke, said other stop being movable between in inoperative position retracted from said slot and an operative position projecting into said slot and having a forwardly facing stop face effective during the rearward stroke, said control member passing said stops when transversely displaced during the forward stroke; operating means for moving said other stop between said positions and for moving said arresting means to and from said arresting position and including electromagnetic means operatively connected to said arresting means and switch means operated by said pressure roller means when the same moves out of said operative position so that said arresting means is released when said counter pressure roller means moves out of said operative position, while said other stop means moves to said inoperative position so that said control member passes said one stop during the return stroke when transversely displaced and is stopped in said control position by said front face of said other stop in said operative position permitting forward movement of said control member to said end position, said control member passing said other stop when the same is in said inperative position while said pressure roller means is in its inoperative position.

References Cited in the file of this patent

UNITED STATES PATENTS

| | | |
|---|---|---|
| 2,076,241 | Luehrs | Apr. 6, 1937 |
| 2,220,255 | Marchev et al. | Nov. 5, 1940 |
| 2,335,954 | Neal | Dec. 7, 1943 |
| 2,558,157 | Robinson | June 26, 1951 |